United States Patent
Tien et al.

(10) Patent No.: US 7,145,781 B1
(45) Date of Patent: Dec. 5, 2006

(54) ELECTRONIC DEVICE HAVING A REPLACEABLE CASING PANEL

(75) Inventors: Kai-Chen Tien, Taipei (TW); Chien-Chuan Chen, Taipei (TW); Han-Shun Wu, Taipei (TW); Chien-Te Li, Taipei (TW); Fang-Yu Hsieh, Taipei (TW); Jian-Ming Peng, Taipei (TW)

(73) Assignee: Inventec Corporation, Taipei (TW)

( * ) Notice: Subject to any disclaimer, the term of this patent is extended or adjusted under 35 U.S.C. 154(b) by 0 days.

(21) Appl. No.: 11/344,001

(22) Filed: Feb. 1, 2006

(51) Int. Cl.
*H05K 5/00* (2006.01)
*H05K 5/04* (2006.01)
*H05K 5/06* (2006.01)

(52) U.S. Cl. .................... 361/752; 361/685; 361/737
(58) Field of Classification Search ........ 361/683–686, 361/736–737, 752–753
See application file for complete search history.

(56) References Cited

U.S. PATENT DOCUMENTS

| | | | |
|---|---|---|---|
| 5,659,459 A * | 8/1997 | Wakabayashi et al. ...... | 361/753 |
| 5,673,171 A * | 9/1997 | Varghese et al. ............ | 361/685 |
| 6,831,830 B1 * | 12/2004 | Bruner et al. ............... | 361/685 |
| 6,914,777 B1 * | 7/2005 | Hsu ........................... | 361/683 |
| 6,956,738 B1 * | 10/2005 | Bruner et al. ............... | 361/685 |

* cited by examiner

*Primary Examiner*—Tuan Dinh
(74) *Attorney, Agent, or Firm*—Bacon & Thomas, PLLC

(57) ABSTRACT

An electronic device having a replaceable casing panel comprises a first portion and a second portion. The first portion includes a gliding member having a plurality of second positioning elements corresponding to a plurality of first positioning elements, and each second positioning element includes a fixing element for fixing the gliding member in the first portion and restricting the moving direction of the gliding member, and the gliding member includes a first panel that slides with the gliding member. The second portion includes a second panel having a plurality of third embedding elements and a plurality of fourth embedding elements embedded with each other, and the second portion includes a plurality of first embedding elements and a plurality of second embedding elements, such that the first panel can be pushed to form a gap for replacing the second panel.

5 Claims, 3 Drawing Sheets

ELECTRONIC DEVICE HAVING A REPLACEABLE CASING PANEL

FIELD OF THE INVENTION

The present invention relates to an electronic device, and more particularly to an electronic device having a replaceable casing panel capable of being replaced by a user without the need of using any tool

BACKGROUND OF THE INVENTION

In recent years, various information products such as monitors, panel PCs, notebook computers, and LCD PCs are developed constantly, particularly notebook computers are used extensively in many different industries as well as our life and working environment. Unquestionably, such development trend not only improves the speed and efficiency of information distributions, but also brings tremendous convenience to our life and work.

As implied by its name, the aforementioned notebook computer similar to a notebook can be carried and operated conveniently. Regardless of the weight and volume, the casing of a notebook computer tends to have a light, thin, short, and compact design as well as an all-in-one function. Therefore, the all-in-one model has become a generic name of the present portable computers. A notebook computer generally includes a main system and a display screen, wherein the display screen is pivotally coupled onto a side of the main system by at least one pivot, so that the display screen can be lifted or shut by using the pivot as an axle center. In the meantime, the main system sends information to the display screen through a communication line, so that the display screen can display the content of such information for users' viewing.

In the severe competition of the present information market, there are various different brands of notebook computers, and thus creating a tremendous pressure to computer manufacturers. As to consumers, more choices are provided for their purchase, and thus consumers can buy a user-friendly multifunctional information product with a reasonable price. Providing such products is a key factor of determining whether or not a manufacturer can stand out from such a severe competition of the market.

In general, a casing of the notebook computer designed and manufactured by different designers and manufacturers adopts an exquisite and artistic style, but the casing is usually scratched or damaged by other external objects due to the long use of the computer or users' negligence, and thus will ruin the overall artistic appearance and the quality of the notebook computer. Therefore, if a casing is scratched or damaged, there are several ways of solving the problem as follows:

(1) Users may buy a brand new notebook computer for their false pride and handsome appearance, and thus wasting money on unnecessary expenditures.

(2) Users may send the notebook computer to the original manufacturer for repair. However the manufacturer usually replaces the whole casing, instead of the damaged part, and thus incurring a relatively high cost, wasting resources, and increasing consumer's expenses.

(3) Users may choose not to change the casing to save money, and thus have to bear with the ugly look of the damaged casing.

At present, users cannot change a notebook computer casing by themselves just like what we can do to a mobile phone casing, and thus users cannot renew a damaged casing or show a user's personal style.

Further, the design of some notebook computers emphasizes on replacing a decorative panel or a portion of the casing, but such design allows a change or replacement of a portion of the casing only, but not for the whole casing, and thus the effect is not too good. Furthermore, users have to go through a more complicated procedure that requires tools to complete the replacement and causes inconvenience to users.

In recent years, the quality of notebook computers is almost the same, and the features provided by the notebook computers become the keys to success. It will be a good selling point as well as a good business opportunity for manufacturers to produce a replaceable casing that allows users to replace the casing on their own if the casing is worn out or damaged, or users want to change the casing according to their personal preference. Such casing can greatly reduce maintenance costs and users can have a computer casing of their own personal preference. In the meantime, the casing of this sort also brings tremendous convenience to consumers and business opportunities to computer manufacturers.

SUMMARY OF THE INVENTION

In view of the shortcomings of the prior art notebook computer casings, the inventor of the present invention based on years of experience in the related industry to conduct extensive researches and experiments, and finally invented an electronic device having a replaceable casing panel.

Therefore, it is an objective of the present invention to provide an electronic device having a replaceable casing panel, and the design has the following advantages:

1. Users can replace a second panel on the casing easily without the need of using any tool (since the casing and panel come with a screwless design).

2. When users are installing or removing the second panel on the casing, it is not necessary to turn off the computer, so that users can avoid rebooting the computer and save time. Such design completely complies with the requirements of a simple installation procedure.

3. Users can freely replace the second panel on the casing to fit their personal preference, and thus the design can meet the requirements of youngsters who want to have changes of the panel from time to time and the design of a user interface (UI).

To achieve the foregoing objectives, the technical measures taken by the invention includes a casing comprising a first portion and a second portion disposed on a casing. The first portion includes a gliding member therein, and both lateral sides of the gliding member separately include a plurality of second positioning elements, and the second positioning elements correspond to a plurality of first positioning elements disposed separately on the internal walls at both lateral sides of the first portion, and each second positioning element includes a fixing element for fixing the gliding member in the first portion and restricting the moving direction of the gliding member, and the gliding member includes a first panel that slides with the gliding member. The second portion includes a second panel, and the connecting position of the second panel and the first panel is covered and pinned down by the first panel, and the second panel includes a plurality of third embedding elements disposed separately on both lateral sides of the second panel, and a plurality of fourth embedding elements disposed at a distal edge, and the third and fourth embedding elements are embedded correspondingly with each other, and the second portion includes a plurality of first embedding elements disposed separately on both lateral sides of the second portion and a plurality of second embedding elements disposed at a distal edge, such that users just need to push the first panel to produce a gap to take out the second panel for the replacement.

The above and other objects, features and advantages of the present invention will become apparent from the following detailed description taken with the accompanying drawings.

DETAILED DESCRIPTION OF THE PREFERRED EMBODIMENTS

Figure 1:
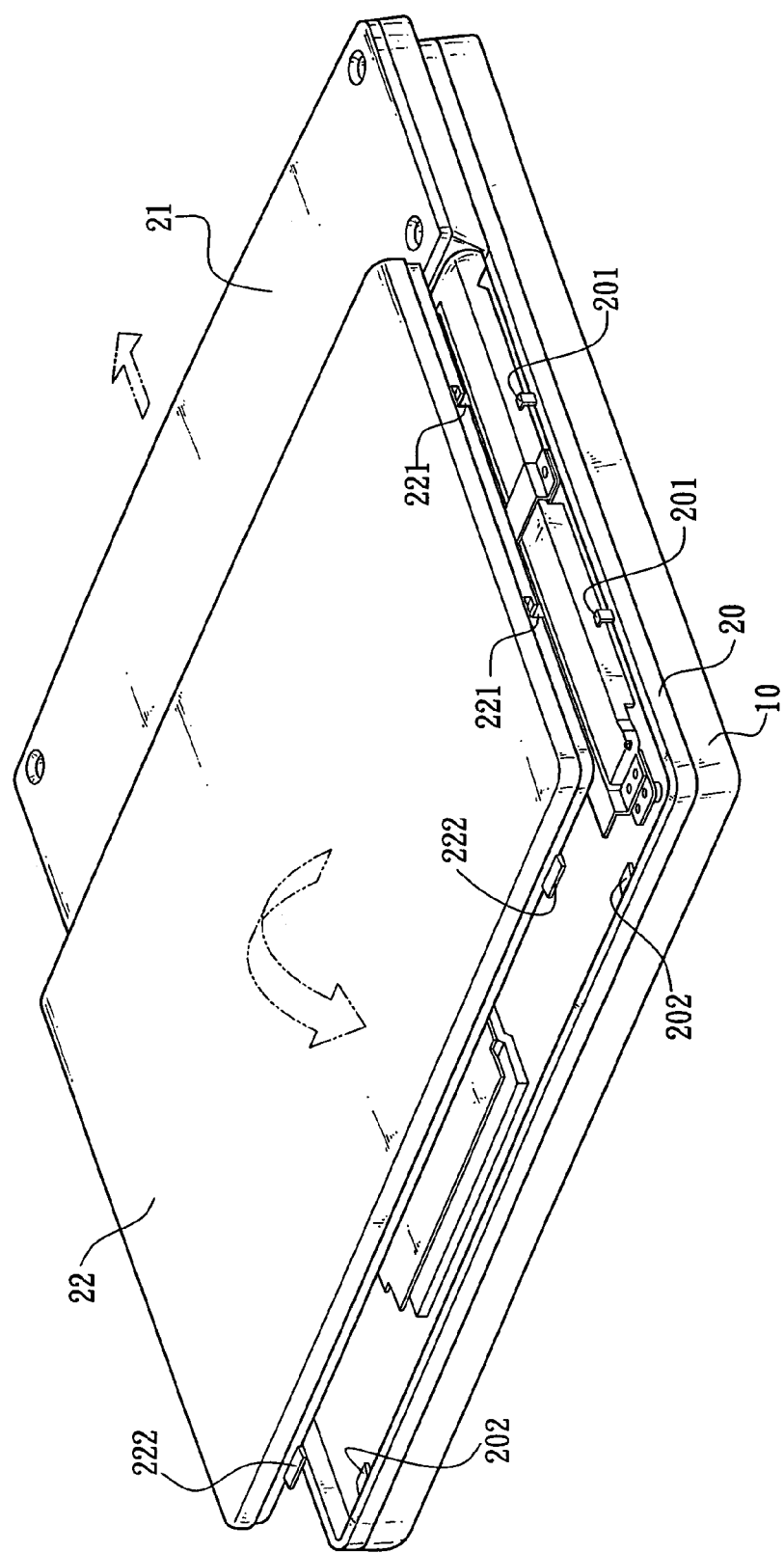
FIG. 1 is a schematic view of the structure of the invention.
Figure 2:
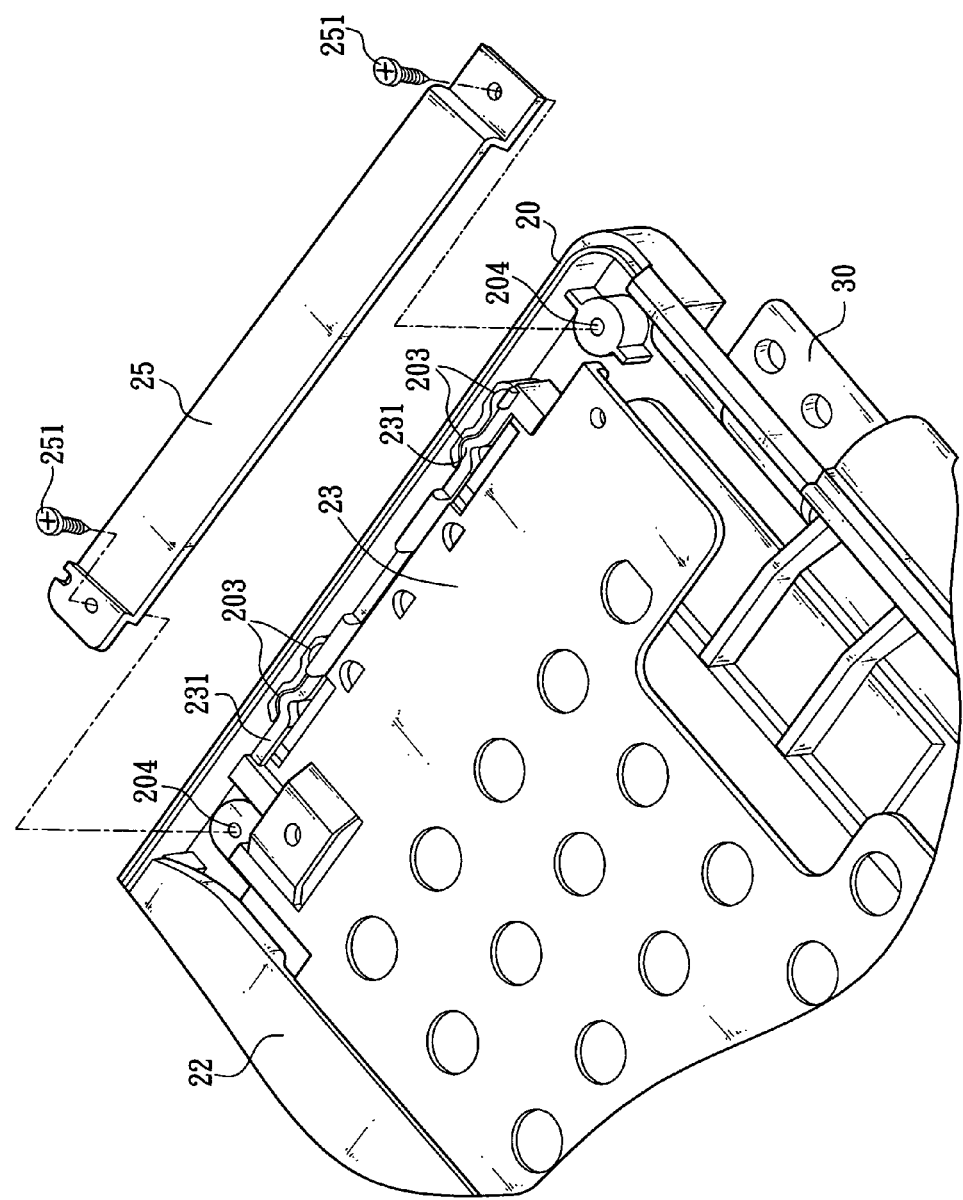
FIG. 2 is a another schematic view of the structure of the invention.
Figure 3:
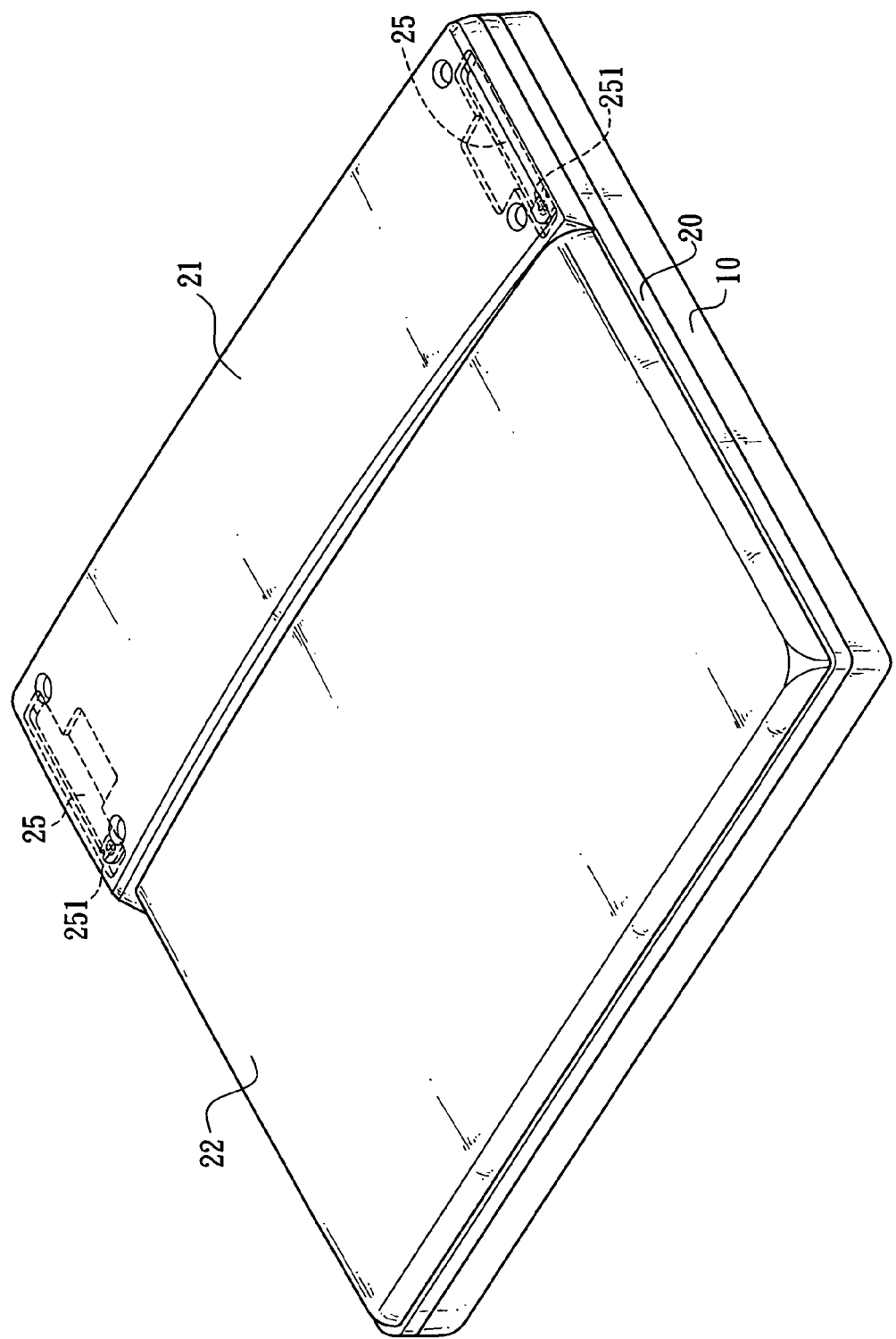
FIG. 3 is a perspective view of the invention.

Referring to FIG. 1 for the electronic device having a replaceable casing panel according to a preferred embodiment of the present invention, the electronic device is a notebook computer, and the notebook computer includes a main system housing 10 and a screen casing 20; wherein the screen casing 20 is pivotally coupled onto a surface of the main system housing 10 by at least one pivot 30 (as shown in FIG. 2), such that the screen casing 20 can be lifted up or shut by using the pivot 30 as the axle center, and the screen casing 20 includes a first portion and a second portion, and the first portion and the second portion comprise a first panel 21 and a second panel 22 respectively, wherein the first panel 21 can be slid, covered and pinned down at a position connected with the second panel 22 by the first panel 21 (as shown in FIG. 3). If it is necessary to replace the second panel 22 (when the second panel 22 is worn out or damaged, or a user wants to change the second panel 22 according to their personal preference), the user just needs to push the first panel 21 in a direction indicated by the arrow in FIG. 1 to produce a gap, such that the connecting position of the first panel 21 and the second panel 22 can be uncovered to remove and replace the second panel 22 easily.

In FIG. 1, both lateral sides of the second portion of the screen casing 20 separately include a plurality of first embedding elements 201 with a predetermined distance apart from each other, and a distal edge where the two lateral sides are connected includes a plurality of second embedding elements 202 with a predetermined distance apart from each other, and the second panel 22 is embedded in the second portion, and both lateral sides of the second panel 22 separately include a plurality of third embedding elements 221 with a predetermined distance apart from each other, and a distal edge where the two lateral sides are connected includes a plurality of fourth embedding elements 222 with a predetermined distance apart from each other, and the third embedding elements 221 and the fourth embedding elements 222 are embedded into the first embedding elements 201 and the second embedding elements 202 on both lateral sides of the second portion of the screen casing 20 respectively, wherein each third embedding element 221 is an L-shape slot, and each of the first embedding elements 201, the second embedding elements 202, and the fourth embedding elements 222 is an embedding member extended outwardly along the lateral sides or the distal edge.

The third embedding elements 221 and the fourth embedding elements 222 on the second panel 22 are embedded into the first embedding elements 201 and the second embedding element 202 on the screen casing 20 respectively, such that after a user pushes the first panel 21 in a direction indicated by the arrow in FIG. 1 to produce a gap, the original connecting position of the first panel 21 and the second panel 22 is uncovered for removing and replacing the second panel 22 easily.

Referring to FIG. 2, a plurality of first positioning elements 203 are provided separately at the internal walls on both lateral sides of the first portion of the screen casing 20 with a predetermined distance apart from each other, and a gliding member 23 is disposed inside the first portion of the screen casing 20, and a plurality of second positioning elements 231 are provided separately on both lateral sides of the gliding member 23 with a predetermined distance apart from each other, and the second positioning elements 231 can be precisely and respectively fixed to the first positioning elements 203, and the first panel 21 installed on the gliding member 23 can slide with the gliding member 23, wherein each second positioning element 231 is a resilient protruding member in the shape of a long bar, and each first positioning element 203 is a semicircular recessed member.

Further, the second positioning elements 231 on both lateral sides of the gliding member 23 are secured separately to a fixing element 25, and both ends of the fixing element 25 are fixed to a two-screw hole 204 disposed in the second portion of the screen casing 20 by a screw 251, and the function of the fixing element 25 is to restrict the moving direction of the gliding member 23 and fix the gliding member 23 in the screen casing 20. In the meantime, the interval for installing the two-screw hole 204 falls precisely between the limit points of the sliding path of the second positioning elements 231 disposed on both lateral sides of the gliding member 23 to assure the positioning when a user pushes the first panel 21.

If the first panel 21 is pushed in a direction indicated by the arrow in FIG. 1, the second positioning elements 231 disposed on both lateral sides of the gliding member 23 are driven to a position into the first positioning elements 203 disposed at the internal walls on both lateral sides of the screen casing 20, so as to secure the positioning after the gliding member is slid (as shown in FIG. 2).

Referring to FIGS. 1 to 3, a user just needs to carry out the following procedure if the user wants to change the second panel 22 (when the second panel 22 is worn out or damaged, or the user wants to change the second panel 22 according to the user's personal preference):

Firstly, the user just needs to push the first panel 21 in a direction indicated by the arrow in FIG. 1 to produce a gap, the original connecting position of the first panel 21 and the second panel 22 is uncovered, and the first panel 21 will drive the second positioning elements 231 on both lateral sides of the gliding member 23 to a position into the first positioning elements 203 disposed at the internal walls on both lateral sides of the screen casing 20 to secure the positioning after the sliding member is slid (as shown in FIG. 2).

Secondly, the third embedding elements 221 and the fourth embedding elements 222 of the second panel 22 embedded respectively into the first embedding elements 201 and the second embedding elements 202 of the screen casing 20 are removed for replacing the panel easily.

After the second panel 22 is replaced, the first panel 21 is pushed back to its original position to complete the replacement of the second panel 22.

With the structural design of the present invention, users need not to secure or loosen any screw to complete the replacement of the second panel 22. Further, it is not necessary to turn off the computer when installing or removing the panels, and thus saving the trouble and time of rebooting the computer. Users can freely replace the second panel 22 according to their preference, and the present invention fully complies with the requirements of the youngsters who want to have changes of a panel from time to time and the design of a user interface (UI).

While the invention herein disclosed has been described by means of specific embodiments, numerous modifications and variations could be made thereto by those skilled in the art without departing from the scope and spirit of the invention set forth in the claims.

What is claimed is:

1. An electronic device having a replaceable casing panel, comprising:
   a casing, having a first portion and a second portion, wherein a plurality of first positioning elements are provided separately at internal walls on both lateral sides of said first portion with a predetermined distance apart from each other, a plurality of first embedding elements are provided separately at two opposite lateral sides of said second portion with a predetermined distance apart from each other, and a plurality of second embedding elements are provided at another side adjacent to said two lateral sides of said second portion with a predetermined distance apart from each other;
   a gliding member, disposed inside said first portion of said casing, and having a plurality of second positioning elements provided on both lateral sides of said gliding member with a predetermined distance apart from each other, whereby said second positioning elements can be precisely and respectively positioned with said first positioning elements;
   a fixing element, fixed separately to said casing at positions corresponding to said second positioning elements on both lateral sides of said gliding member for positioning said gliding member within said first portion and restricting said gliding being moved within a predetermined distance;
   a first panel, fixed to said gliding member and sliding with said gliding member; and
   a second panel, disposed on said second portion of said casing and having one side adjacent to said first panel being movably covered and limited by a corresponding side of said first panel, wherein a plurality of third embedding elements are provided at two opposite lateral sides of the second panel, and a plurality of fourth embedding elements are provided at another side adjacent to said two lateral sides of said second panel with a predetermined distance apart from each other, whereby said third embedding elements and said fourth embedding elements being embedded respectively into said first embedding elements and said second embedding elements disposed on both lateral sides of said second portion of said casing.

2. The electronic device having a replaceable casing panel of claim 1, wherein said fixing element have both ends fixed into a two-screw hole in said second portion of said casing separately by a screw, and the interval for installing said two-screw hole falls between the limit points of a gliding path of said second positioning element on both sides of said gliding member.

3. The electronic device having a replaceable casing panel of claim 2, wherein said first positioning element is a semicircular concave member, and said second positioning element is a rectangular elastic convex member.

4. The electronic device having a replaceable casing panel of claim 3, wherein said first embedding element, said second embedding element, and said fourth embedding element are separate embedding members extended along a lateral edge or a distal edge, and said third embedding element is an L-shape slot.

5. The electronic device having a replaceable casing panel of claim 4, wherein said casing is a screen casing of a notebook computer.

* * * * *